United States Patent [19]
Haider

[11] Patent Number: 6,135,963
[45] Date of Patent: Oct. 24, 2000

[54] IMAGING SYSTEM WITH TRANSMIT APODIZATION USING PULSE WIDTH VARIATION

[75] Inventor: Bruno Hans Haider, Ballston Lake, N.Y.

[73] Assignee: General Electric Company, Schenectady, N.Y.

[21] Appl. No.: 09/207,015

[22] Filed: Dec. 7, 1998

[51] Int. Cl.[7] .................................................. A61B 8/00
[52] U.S. Cl. .......................................................... 600/447
[58] Field of Search .................................... 600/437, 443, 600/447, 659; 73/631, 625–626

[56] References Cited

U.S. PATENT DOCUMENTS

| 4,241,611 | 12/1980 | Specht et al. | 600/459 |
| 4,937,767 | 6/1990 | Reuschel et al. | 73/609 |
| 5,113,706 | 5/1992 | Pittaro | 73/626 |
| 5,833,614 | 11/1998 | Dodd et al. | 600/447 |

OTHER PUBLICATIONS

Eli Brookner, "Practical Phased Array Antenna Systems", Artech House, 1991, pp. 2–10.
Oppenheim, Schafer, "Digital Signal Processing", Prentice Hall, 1975, pp. 239–250.

Primary Examiner—Francis J. Jaworski
Attorney, Agent, or Firm—Marvin Snyder; Douglas E. Stoner

[57] ABSTRACT

A coherent imaging system having a phased array of transmit elements provides for transmit apodization (or weighting) by controlling pulse width of the transmit pulses on every channel. Conventional transmit apodization requires a channel-by-channel voltage (or current) control which, because of its complexity, is expensive to implement. Pulse width weighting applies the same peak voltage/current but controls pulse power by changing the duty cycle of the pulse.

17 Claims, 4 Drawing Sheets

IMAGING SYSTEM WITH TRANSMIT APODIZATION USING PULSE WIDTH VARIATION

FIELD OF THE INVENTION

This invention generally relates to coherent imaging methods which employ a phased array antenna. In particular, the invention relates to transmit apodization techniques for use in ultrasound imaging systems.

BACKGROUND OF THE INVENTION

A medical ultrasound system forms an image by acquiring individual ultrasound lines (or beams). The lines are adjacent to each other and cover the target area to be imaged. Each line is formed by transmitting an ultrasonic pulse in a particular spatial direction and receiving the reflected echoes from that direction. The spatial characteristics of the transmitted wave and the characteristics of the receive sensitivity determine the quality of the ultrasound image. It is desirable that the ultrasound line gather target information only from the intended direction and ignore targets at other directions. Unfortunately, this is an idealistic goal which is physically not achievable.

For ultrasound imaging, typically an array of piezoelectric transducer elements are driven with separate voltages. By selecting the time delay (or phase) and amplitude of the applied voltages, the individual transducer elements can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. When using a steered array, by changing the time delays and amplitudes of the applied voltages, the beam with its focal point can be moved in a plane to scan the object. When using a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

Medical ultrasound is a coherent imaging method. The spatial characteristics of the ultrasound line are determined by the transmit and receive apertures of the transducer and the frequency spectrum of the echo signal. The effective beam shape is the product of the transmit and receive diffraction patterns. Each diffraction pattern is characterized by its mainlobe width and sidelobe levels. In particular, the mainlobe width determines the image resolution, while the sidelobe levels affect the interference from targets outside the desired beam direction. To achieve good contrast resolution, a low sidelobe level is imperative. For example, when imaging an area of low echogenicity, the sidelobes of the beam can receive echoes from brighter structures surrounding the region of interest and contaminate the area of low echogenicity.

Aperture weighting is a way of reducing the sidelobe level in the diffraction pattern. Imaging systems with array transducers have employed aperture weighting for both transmit and receive apertures. In medical ultrasound, receive aperture weighting, due to its implementation simplicity, is more commonly applied than transmit weighting, which is presently limited to high-end systems because of the associated implementation cost and complexity.

A channel transmitter in a medical ultrasound system generates an excitation signal which is typically a square wave with two or three cycles. The waveform amplitude is controlled to achieve the weighting. While the square wave creates a significant amount of higher harmonics, this harmonic content does not affect beam formation because it is greatly suppressed by the bandpass characteristic of the transducer and the frequency-dependent attenuation of the propagation medium.

Both transmit and receive aperture weightings are commonly seen in medical ultrasound equipment. Receive aperture weighting is typically implemented as programmable attenuators and/or amplifiers on the signal paths of the transducer elements.

These functions can be well integrated into ASICs (application specific integrated circuits) or other custom chips. The additional product cost is not excessive and warrants the implementation of receive amplitude weighting even in lower-cost systems.

Transmit amplitude weighting can be employed with programmable high-voltage amplifiers, multiple power supplies or programmable current sources. All hardware functions are replicated for every transmit channel. Implementation of transmit aperture weighting is complex and costly and, therefore, not applied in low-end or midrange products. Consequently, need continues to exist for an economical way of implementing transmit aperture weighting in low-end and midrange ultrasound imaging systems.

SUMMARY OF THE INVENTION

The invention, in a preferred embodiment, comprises a method and apparatus for transmit apodization (or weighting) by controlling the pulse width of the transmit pulses on every channel. Conventional transmit apodization requires a channel-by-channel voltage (or current) control which is complex and expensive to implement. Pulse width weighting applies equal peak voltages or currents on all channels, but controls the pulse power by changing the duty cycle of the pulse.

The high product cost of amplitude weighting limits its application to high-end systems while midrange and low-end systems are left without this capability. Pulse width weighting can be implemented with little or no manufacturing cost increase because it is implemented by reprogramming the digital transmit sequence memory which controls the pulse waveform output by the pulsers.

DETAILED DESCRIPTION OF THE PREFERRED EMBODIMENTS

Figure 1:
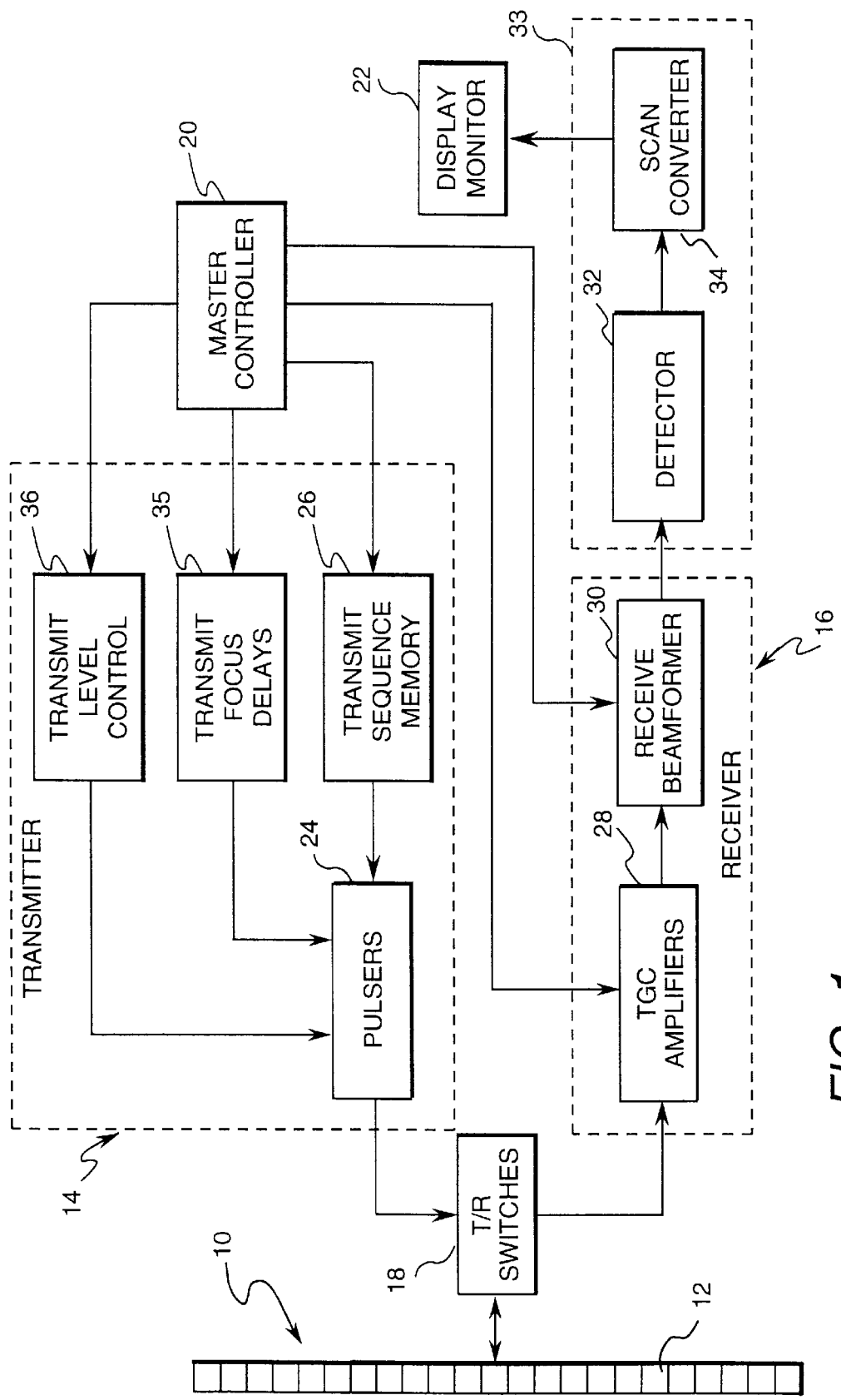
FIG. 1 is a block diagram of an ultrasound imaging system in accordance with a preferred embodiment of the invention.

In FIG. 1, an ultrasonic imaging system in accordance with a preferred embodiment of the invention is shown to comprise a transducer array 10 having a plurality of separately driven transducer elements 12, each of which produces a burst of ultrasonic energy when energized by a pulsed waveform produced by a transmitter 14. Ultrasonic energy reflected back to transducer array 10 from the object under study is converted to an electrical signal by each receiving transducer element 12 and applied separately to a receiver 16 through a set of transmit/receive (T/R) switches 18. Transmitter 14 and receiver 16 are controlled by a master controller 20 responsive to commands by a human operator. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal that is used to produce a line in an image on a display monitor 22.

Figure 2:
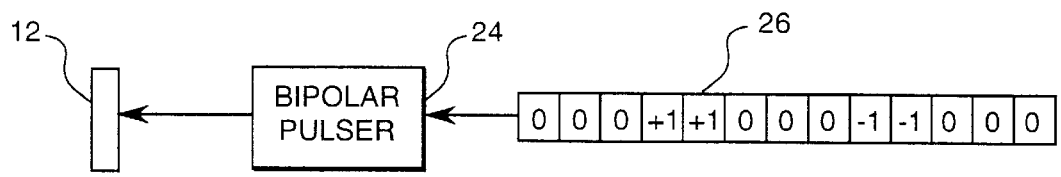
FIG. 2 is a block diagram showing an example of pulsing a single transducer element with a transmit sequence.

In accordance with a preferred embodiment of the invention, pulse width weighting of the transmit pulses in each channel is implemented by programming a digital transmit sequence memory 26. Each transducer element 12 in the transmit aperture is pulsed by a pulse waveform supplied by a respective bipolar pulser 24 in response to a respective transmit sequence provided to the respective pulser from transmit sequence memory 26. The duty cycle of each pulse waveform is determined by the respective transmit sequence. For example, FIG. 2 shows one such transmit sequence, stored in transmit sequence memory 26, for driving a transducer element 12. The +1 and −1 elements of each transmit sequence are transformed into pulses of opposite phase by a respective bipolar pulser 24, while the 0 elements correspond to no pulse. The duty cycle or pulse width is proportional to the number of consecutive +1's or −1's in the transmit sequence.

Under the direction of master controller 20, transmitter 14 drives transducer array 10 such that the ultrasonic energy is transmitted as a directed focused beam. To accomplish focusing, respective time delays are imparted to the bipolar pulsers 24 by a transmit focus delay circuit 35, while respective pulse amplitudes are set by a transmit level control 36. Master controller 20 determines the conditions under which the acoustic pulses will be transmitted. With this information, the transmit focus delays and transmit level control will respectively determine the timing and amplitude of each of the transmit pulses to be generated by pulsers 24. The pulsers in turn send the transmit pulses to each of elements 12 of transducer array 10 via T/R switches 18, which protect time-gain control (TGC) amplifiers from the high voltages which may exist at the transducer array. By appropriately adjusting the transmit focus time delays in a conventional manner, an ultrasonic beam can be directed and focused at a transmit focal position.

The echo signals produced by each burst of ultrasonic energy reflect from objects located at successive ranges along each ultrasonic beam. Due to differences in the propagation paths between a reflecting point and each transducer element, the echo signals are not detected simultaneously and their amplitudes are not equal. Receiver 16 amplifies the separate echo signals via a respective TGC amplifier 28 in each receive channel. The amount of amplification provided by the TGC amplifiers is controlled through a control line (not shown) that is driven by a TGC circuit (not shown), the latter being set, for example, by hand operation of potentiometers. The amplified echo signals are then fed to a receive beamformer 30 which imparts the proper time delays to the respective amplified echo signals. The receive channels also include circuitry (not shown) for filtering the received pulses. The receive beamformer sums the time-delayed signals to provide an echo signal that accurately represents the total ultrasonic energy reflected from a point located at a particular range along the ultrasonic beam.

The beamsummed receive signals are supplied to a signal processor 33 including a detector 32 which converts the beamsummed receive signals to display data. In the B-mode (gray-scale), the envelope of the signal with some additional processing, such as edge enhancement and logarithmic compression, makes up the display data. A scan converter 34 in processor 33 receives the display data from detector 32 and converts the data into the desired image for display. In particular, scan converter 34 converts the acoustic image data from polar coordinate (R—θ) sector format or Cartesian coordinate linear format to appropriately scaled Cartesian coordinate display pixel data at the video rate. The scan-converted acoustic data are then provided for display on display monitor 22, which images the time-varying amplitude of the envelope of the signal as a gray scale.

Figure 3:
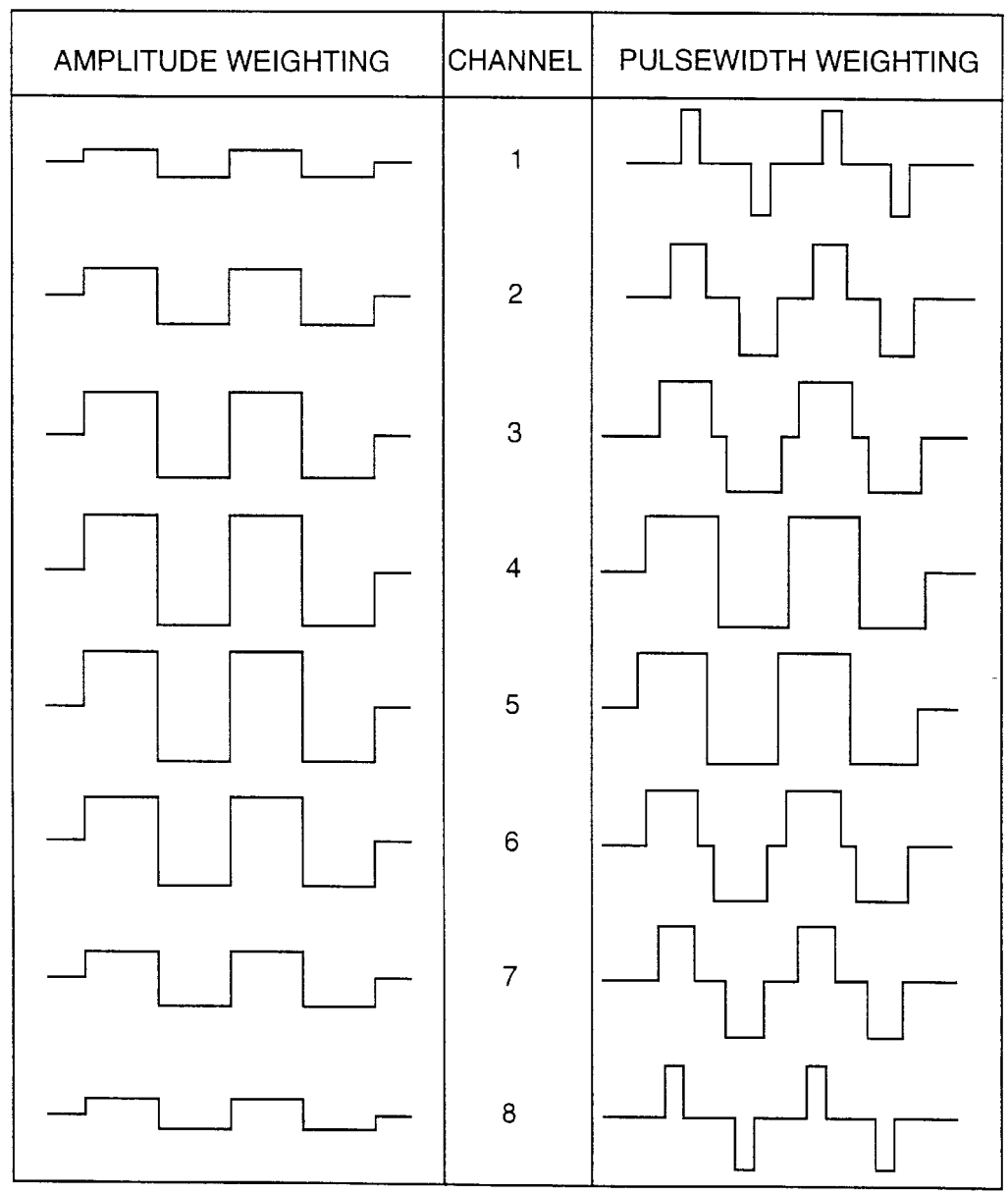
FIG. 3 is a chart comparing excitation waveforms of conventional amplitude weighting with those of pulse width weighting.

The invention allows for transmit aperture weighting without need to control amplitude of the excitation signal on a channel-to-channel basis. Instead of modifying the waveform amplitude, the pulse width of the signal is changed. FIG. 3 shows the excitation waveforms of several channels with amplitude weighting on the left and pulse width weighting on the right. With amplitude weighting, all channels use the same pulse shape but at different voltage levels. Pulse width weighting applies the same voltage, but changes the pulse shape to control the pulse power. For simplicity, the transducer array is assumed to have only 8 elements. In this example, the transmit power of the edge channels 1 and 8 is lowest while the center channels 4 and 5 apply the highest power. As can be seen in FIG. 3, the transmit power, for uniform amplitude, is proportional to the pulse width, whereas in conventional amplitude weighting the pulse width is uniform and the transmit power increases with the pulse amplitude.

Figure 4:
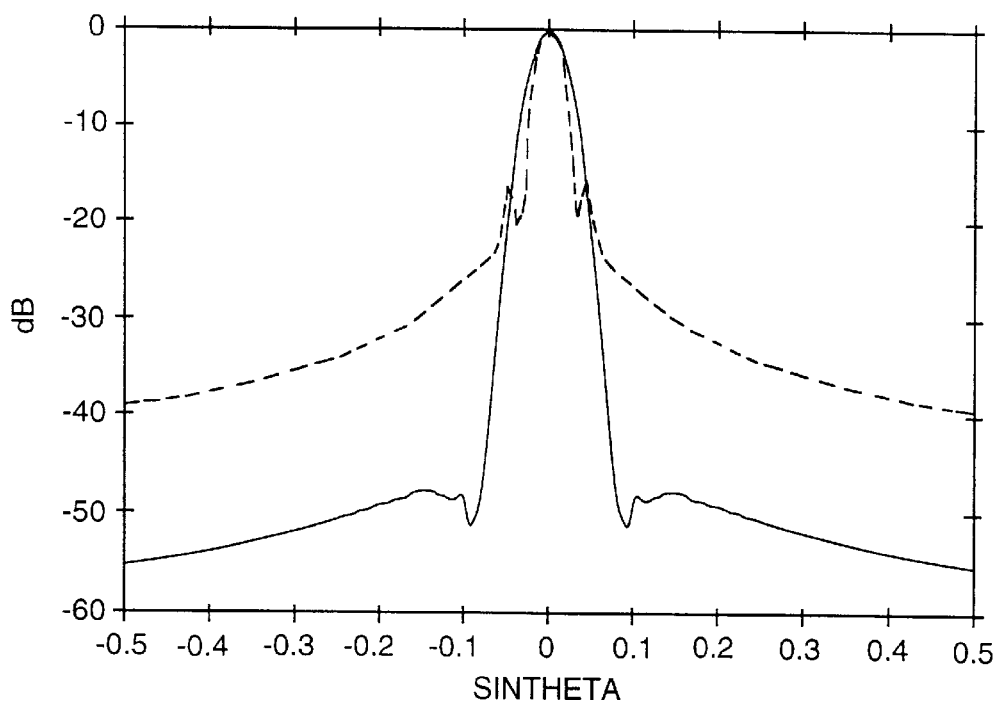
FIG. 4 is a graph showing typical transmit beam profiles using uniform (dashed line) and Hamming (solid line) amplitude weightings.

As an example, FIG. 4 compares the transmit beam patterns of a uniform amplitude aperture (dashed line) against a Hamming amplitude-weighted aperture (solid line). The Hamming-weighted aperture reduces the sidelobe level by about 17 dB. The trade-off for this sidelobe level reduction is a widening of the mainlobe, which results in degraded resolution. However, this trade-off is typically acceptable for the applications considered.

Figure 5:
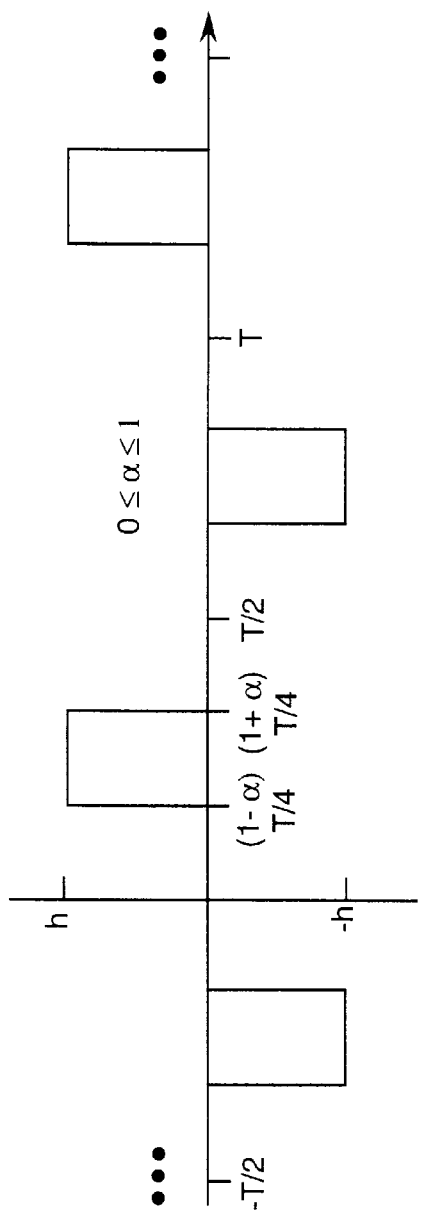
FIG. 5 is a graph depicting square wave excitation signals with pulse width control.

FIG. 5 supports a more detailed analysis of the relationship between amplitude and pulse width weighting. The waveform shown is a bipolar square wave with variable pulse width. Three parameters (h, α, T) specify the waveform, where h is the amplitude, T is the pulse period and α is the pulse width control parameter. The fundamental frequency is the inverse of the pulse period T and is typically selected to be close to the transducer center frequency. The number of pulse cycles (typically 2 or 3 cycles) is not significant for the analysis here. The pulse width parameter α, which has the characteristic of a duty cycle, is in the range of 0 to 1. While α affects the waveform spectrum, it also controls the waveform power.

Figure 6:
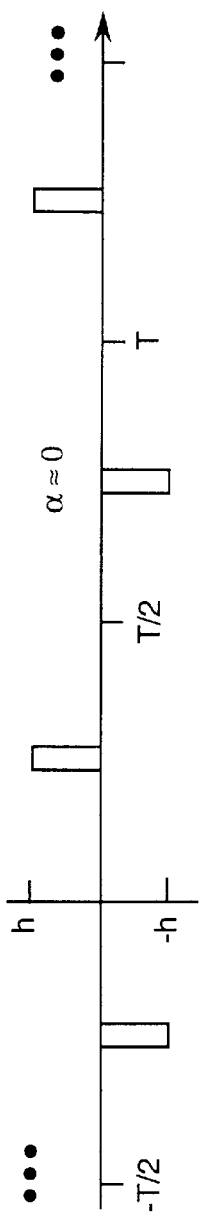
FIGS. 6 and 7 are graphs depicting pulse width-controlled waveforms for the cases $\alpha \approx 0$ and $\alpha \approx 1$, respectively.
Figure 7:
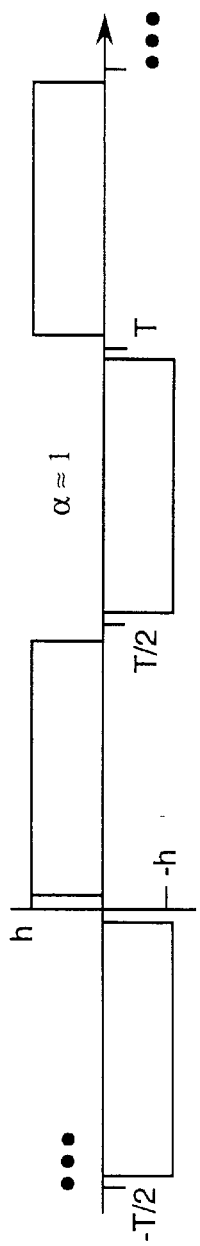

FIGS. 6 and 7 show the extreme cases for α≈0 and α≈1, respectively. The pulse type α≈1(full duty cycle) is applied in a typical ultrasound transmitter. Examples of transmit sequences which can be used to approximate these extreme cases are the following: [0,0,0,0,+1,0,0,0,0,0,0,0,0,0,0,−1,0, 0,0,0] for α≈0 and [0,+1,+1,+1,+1, +1,+1,+1,+1,+1,0,−1,− 1,−1,−1,−1,−1,−1,−1,0]for α≈1.

With the parameters described above, the effect of pulse width weighting is as follows. (The pulse period T is the same as in the case of a conventional system. Similarly, the pulse amplitude h is the same as the highest amplitude in an amplitude-weighted system.) The pulse width-weighted system transmits pulses of equal amplitude h but varying pulse width $\alpha_i$. To achieve a desired amplitude weighting $w_i$ for the i-th transmit channel, an appropriate $\alpha_i$ must be determined which, in the end, creates a beam characteristic similar to that which would result from the amplitude weight $w_i$. Since the transducer element filters out the higher harmonics of the excitation waveform, the relevant signal power arises only from the first harmonic. Therefore, the amplitude weighting $w_i$ must be mapped to the pulse width $\alpha_i$ such is that the first harmonic amplitude of the pulse width-weighted waveform is equal to $hw_i$. (It is assumed that both $w_i$ and $\alpha_i$ range from 0 to 1.0.)

The amplitude of the first harmonic b of the pulse width-controlled waveform is the first-order Fourier series coefficient $$b(\alpha) = \frac{4h}{\pi} \sin\left(\frac{\pi}{2}\alpha\right). \quad (1)$$

The requirement to match the amplitude of the first harmonic leads to $$\frac{b(\alpha_i)}{b(\alpha=1)} = W_i. \quad (2)$$

From Eqs. (1) and (2) follows the mapping $$\alpha_1 = \frac{2}{\pi}\arcsin(W_i). \quad (3)$$

Figure 8:
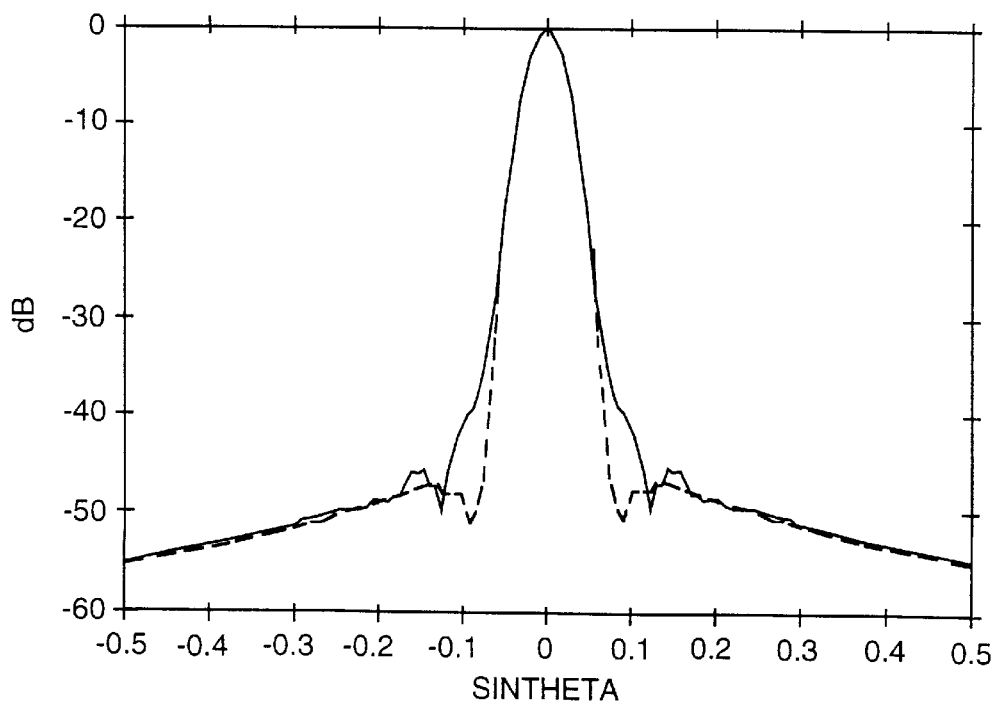
FIG. 8 is a graph showing transmit beam profiles using Hamming amplitude weighting (dashed line) and pulse width weighting solid line).

The example of FIG. 4 can now be expanded to compare Hamming amplitude weighting to the pulse width weighting of the invention. FIG. 8 shows such comparison (the beam profile of Hamming amplitude weighting is the same as in FIG. 4). The pulse width weighting is derived using the mapping of Eq. (3) to match the Hamming amplitude weighting. The profiles of the Hamming amplitude weighting and pulse width weighting match well in both sidelobe levels and mainlobe width. The small deviation at sintheta+ 0.1 is acceptable for the intended application.

While the foregoing description is concentrated on transmit aperture weighting for the reduction of beam sidelobe levels, the method of pulse width control described herein can also be used for acoustic output regulation. Typically, the ultrasound system adjusts the acoustic output by changing its peak excitation voltage or current. However, difficulties in making this adjustment arise when the system is operating in duplex or triple modes. For example, there are configurations in which the system quickly switches between structure (B mode) imaging, Doppler and color flow acquisitions, and each of these modes typically requires a different excitation level. It is common in present technology to provide multiple power supplies which can be quickly switched on and off. Alternatively, a single power supply can be designed to change the excitation level in a short period of time (a few microseconds). However, both approaches significantly increase the complexity and cost of the power supply and the power distribution subsystem.

If for cost reasons neither multiple power supplies nor a single fast regulating supply is available, the system can be operated at a single excitation level that is low enough to ensure that none of the active modes exceeds the desired acoustic output level. In that instance, some of the modes will operate suboptimally and may exhibit a reduced clinical utility.

In accordance with a further aspect of the invention, the acoustic output can be controlled without modifying the peak voltage or current. This is achieved by setting the transmit peak voltage or current to the highest value required by the active modes and, for that active mode, the pulse width is set to α=1 (full duty cycle). In the other modes, where the acoustic output must be reduced, the same peak voltage or current is applied, but α is reduced to achieve the desired power level. In this situation, α may or may not be dependent on the location of the transducer element within the aperture.

The invention is especially applicable to medical diagnostic ultrasound imaging. However, due to the generality of the method set forth herein, the invention may be applied to any type of coherent imaging (radar, sonar, seismology, etc.) which employs a phased array antenna.

A primary benefit of the invention is a reduction in system complexity as compared to a system that employs transmit amplitude weighting. This implies that the manufacturing cost of a high-end ultrasound system can be reduced. Moreover, the invention can make the benefits of transmit aperture weighting available to midrange and low-end systems. Current technology discourages implementation of amplitude weighting in the lower-cost systems because of the price sensitivity of such systems. The method of the invention, however, can be implemented with no additional product cost since it merely requires a modified programming of the transmit sequence memory.

While only certain preferred features of the invention have been illustrated and described herein, many modifications and changes will occur to those skilled in the art. For example, the invention is also applicable in systems having unipolar pulsers. It is, therefore, to be understood that the appended claims are intended to cover all such modifications and changes as fall within the true spirit of the invention.

What is claimed is:

1. A system for transmitting a beam of wave energy, comprising:
    a transducer array having first and second transducer elements and a transmit beamformer programmed to drive said first and second transducer elements with first and second excitation waveforms during a transmit firing, said first excitation waveform including at least first pair of opposite polarity pulses having a first pulse width, and said second excitation waveform including at least a second pair of opposite polarity pulses having a second pulse width different than said first pulse width.

2. The system as defined in claim 1, wherein said first and second transducer elements comprise piezoelectric transducer elements.

3. The system as defined in claim 2, wherein said first and second pulsers are bipolar.

4. The system as defined in claim 1, wherein said transmit beamformer comprises first and second pulsers respectively coupled to said first and second transducer elements, and a transmit sequence memory programmed to provide first and second transmit sequences to said first and second pulsers respectively.

5. The system as defined in claim 1, wherein said transmit beamformer is adapted to drive said first transducer element with said first excitation waveform during said transmit firing, and is further adapted to drive said second transducer element with said second excitation waveform during said transmit firing.

6. The system as defined in claim 5, wherein said first and second transducer elements are piezoelectric transducer elements.

7. The system as defined in claim 5, wherein said transmit beamformer comprises first and second pulsers coupled to said first and second transducer elements, respectively, and a transmit sequence memory for providing first and second transmit sequences to said first and second pulsers, respectively.

8. The system as defined in claim 7, wherein said first and second pulsers are bipolar.

9. A method for operating a transducer array to transmit a beam of wave energy, comprising the steps of driving first and second transducer elements of said transducer array with first and second excitation waveforms during a transmit firing, said first excitation waveform including at least a first pair of opposite polarity pulses having a first pulse width and said second excitation waveform including at least a second pair of opposite polarity pulses having a second pulse width different from said first pulse width.

10. A method for operating an ultrasound imaging system having an array of transducer elements, comprising the steps of: driving said transducer elements to form a transmit aperture with excitation waveforms to form a beam, each of said waveforms including at least one pair of bipolar pulses having a pulse width determined in accordance with a pulse width weighting function;

forming a beamsummed signal from a set of signals transduced by said transducer elements to form a receive aperture following transmission of said beam;

processing said beamsummed signal to form an image signal; and displaying an image wherein at least a portion thereof is a function of said image signal.

11. An ultrasound imaging system comprising:

a transducer array having a multiplicity of transducer elements: driving means for driving said transducer elements selectively to form a transmit aperture with excitation waveforms to form a beam, each of said waveforms including at least one pair of bipolar pulses having a pulse width determined in accordance with a pulse width weighting function;

a beamformer for forming a beamsummed signal from a set of signals transduced by selected ones of said transducer elements to form a receive aperture following transmission of said beam;

a processor for forming an image signal from said beamsummed signal; and a display monitor for displaying an image wherein at least a portion thereof is a function of said image signal.

12. The ultrasound imaging system as defined in claim 11, wherein said driving means comprises a multiplicity of pulsers respectively coupled to said transducer elements, and a transmit sequence memory programmed to provide respective transmit sequences to said pulsers.

13. A method for programming an ultrasound imaging system, comprising the steps of:

computing a set of bipolar transmit pulse widths in accordance with a pulse width weighting function; and loading a set of transmit sequences into said ultrasound imaging system, each of said transmit sequences having a respective characteristic which is a function of a respective one of said set of bipolar transmit pulse widths.

14. The method as defined in claim 13, wherein the step of bipolar computing a set of transmit pulse widths comprises the step of deriving said set of bipolar transmit pulse widths using the mapping $$\alpha_i = \frac{2}{\pi}\arcsin(W_i)$$

where $w_i$ is a desired amplitude weighting for an i-th transmit channel and $\alpha_i$ is a pulse width weighting for the i-th transmit channel.

15. A method for operating an ultrasound imaging system in first and second modes, said first mode requiring a first excitation level and said second mode requiring a second excitation level different than said first excitation level, comprising the steps of:

driving a transducer element with a first excitation waveform including at least a first pair of opposite polarity pulses having a predetermined amplitude and a first pulse width in said first mode; and driving said transducer element with a second excitation waveform including at least a second pair of opposite polarity pulses having said predetermined amplitude and a second pulse width different from said first pulse width in said second mode.

16. An ultrasound imaging system operable in first and second modes, said first mode requiring a first excitation level and said second mode requiring a second excitation level different from said first excitation level, comprising:

a transducer array including a transducer element; and a transmit beamformer for driving said transducer element with a first excitation waveform including at least a first pair of opposite polarity pulses having a predetermined amplitude and a first pulse width in said first mode, and for driving said transducer element with a second excitation waveform including at least a second pair of opposite polarity pulses having said predetermined amplitude and a second pulse width different from said first pulse width in said second mode.

17. A system for imaging ultrasound scatterers, comprising:

an ultrasound transducer array comprising a multiplicity of transducer elements;

a transmit beamformer coupled to said transducer array in a transmit mode;

a receive beamformer selectively coupled to said transducer array in a receive mode;

a controller programmed to:

(a) provide said transmit beamformer with transmit control data that causes said transducer array to transmit an apodized beam, said transmit control data comprising transmit sequences, each of said transmit sequences having a respective characteristic which is a function of a respective one of a set of bipolar transmit pulse widths determined by a respective duty cycle parameter; and (b) provide said receive beamformer with receive control data that causes said receive beamformer to form a beamsummed receive signal from a set of signals transduced by said transducer array following transmission of said beam;

a detector which forms an image signal derived from said beamsummed receive signal; and display means for displaying an image having a portion thereof which is a function of said image signal.

* * * * *